United States Patent
Yang et al.

(10) Patent No.: US 9,036,932 B2
(45) Date of Patent: May 19, 2015

(54) METHOD AND APPARATUS FOR ENCODING/DECODING IMAGE DATA

(75) Inventors: Jiheng Yang, Beijing (CN); Hui Zhang, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 112 days.

(21) Appl. No.: 13/805,195

(22) PCT Filed: Jun. 21, 2010

(86) PCT No.: PCT/CN2010/000901
§ 371 (c)(1),
(2), (4) Date: Dec. 18, 2012

(87) PCT Pub. No.: WO2011/160251
PCT Pub. Date: Dec. 29, 2011

(65) Prior Publication Data
US 2013/0089266 A1 Apr. 11, 2013

(51) Int. Cl.
*G06K 9/36* (2006.01)
*H04N 19/50* (2014.01)
*H04N 19/11* (2014.01)
*H04N 19/176* (2014.01)
*H04N 19/436* (2014.01)
*H04N 19/593* (2014.01)
*G06K 9/46* (2006.01)

(52) U.S. Cl.
CPC .................. *H04N 7/32* (2013.01); *H04N 19/11* (2014.11); *H04N 19/176* (2014.11); *H04N 19/436* (2014.11); *H04N 19/593* (2014.11)

(58) Field of Classification Search
CPC ............ H04N 19/00; H04N 19/00018; H04N 19/00024; H04N 19/00575
USPC ........ 382/232, 233, 238; 375/240.03, 240.05, 375/240.14, 240.16, 240.29, E07.243; 348/571, 580
See application file for complete search history.

(56) References Cited

U.S. PATENT DOCUMENTS

| 6,999,513 B2* | 2/2006 | Sohn et al. ............... 375/240.16 |
| 7,145,948 B2* | 12/2006 | Ye et al. .................. 375/240.03 |
| 8,503,534 B2* | 8/2013 | Rubinstein et al. ...... 375/240.16 |

(Continued)

FOREIGN PATENT DOCUMENTS

| CN | 1127855 C | 11/2003 |
| CN | 101383972 | 3/2009 |
| EP | 0779744 | 6/1997 |
| EP | 2081386 A1 | 7/2009 |

OTHER PUBLICATIONS

Chuang et al., "Algorithm and architecture design for intra prediction in H 264-AVC high profile", Picture Coding Symposium, Lisbon, Portugal, Nov. 7, 2007, pp. 1-5.

(Continued)

*Primary Examiner* — Amir Alavi
(74) *Attorney, Agent, or Firm* — Tutunjian & Bitetto, P.C.

(57) ABSTRACT

Several attempts have been tried to improve the performance of intra-prediction in video encoding and decoding, which are targeting at pixel level parallelization. A solution for implementing an improved intra-prediction method on a parallel processing platform uses estimated predictors instead of reconstructed exact predictors. This enables faster estimation of predictors, and allows an encoder to perform intra-prediction for all blocks of at least a portion of an image simultaneously.

20 Claims, 5 Drawing Sheets

(56) References Cited

U.S. PATENT DOCUMENTS

| | | | |
|---|---|---|---|
| 2008/0219576 A1 | 9/2008 | Jung et al. | |
| 2008/0240240 A1* | 10/2008 | Kodama | 375/240.14 |
| 2009/0274213 A1 | 11/2009 | Zhou et al. | |
| 2011/0150072 A1* | 6/2011 | Han | 375/240.01 |
| 2011/0228853 A1* | 9/2011 | Suzuki et al. | 375/240.16 |
| 2011/0243232 A1* | 10/2011 | Alshina et al. | 375/240.16 |
| 2013/0089266 A1* | 4/2013 | Yang et al. | 382/238 |

OTHER PUBLICATIONS

Munteanu et al., "Applying open-loop coding in predictive coding systems", Advanced Concepts for intelligent vision systems, Springer Verlag, Berlin, Oct. 20, 2008, pp. 25-37.

* cited by examiner

Encoding: 1st phase: prediction of predictors

| X | A  | B  | C  | D     | E | F | G | H |
|---|----|----|----|-------|---|---|---|---|
| I |    |    |    | $d_0$ |   |   |   |   |
| J |    |    |    | $h_0$ |   |   |   |   |
| K |    |    |    | $l_0$ |   |   |   |   |
| L | $m_0$ | $n_0$ | $o_0$ | $p_0$ |   |   |   |   | a)     Step 1: predict $d_0,h_0,l_0,m_0,n_0,o_0,p_0$ from <u>original</u> A-L

|       |       |       | $d_0$ |       |       |       | $d_1$ |
|-------|-------|-------|-------|-------|-------|-------|-------|
|       |       |       | $h_0$ |       |       |       | $h_1$ |
|       |       |       | $l_0$ |       |       |       | $l_1$ |
| $m_0$ | $n_0$ | $o_0$ | $p_0$ | $m_1$ | $n_1$ | $o_1$ | $p_1$ |
|       |       |       | $d_2$ |       |       |       | $d_3$ |
|       |       |       | $h_2$ |       |       |       | $h_3$ |
|       |       |       | $l_2$ |       |       |       | $l_3$ |
| $m_2$ | $n_2$ | $o_2$ | $p_2$ | $m_3$ | $n_3$ | $o_3$ | $p_3$ | b) End of 1st phase: all predictors are predicted

Step 2:
determine the residuals between the estimated predictors and their original pixels, and perform quantization and inv. quantization of the residuals (m' from eq.(2))

Fig. 4

Encoding 2$^{nd}$ phase: prediction and reconstruction of remaining pixels (parallel, simultaneously in all blocks) based on the predicted, quantized/inverse quantized predictors and original pixels

|   | X | A | B | C | D | E | F | G | H |   |
|---|---|---|---|---|---|---|---|---|---|---|
|   | I | $a_0$ | $b_0$ | $c_0$ | $d'_0$ |   |   |   | $d'_1$ |   |
| B0 | J | $e_0$ | $f_0$ | $g_0$ | $h'_0$ |   |   |   | $h'_1$ | B1 |
|   | K | $i_0$ | $j_0$ | $k_0$ | $l'_0$ |   |   |   | $l'_1$ |   |
|   | L | $m'_0$ | $n'_0$ | $o'_0$ | $p'_0$ | $m'_1$ | $n'_1$ | $o'_1$ | $p'_1$ |   |
|   |   |   |   |   | $d'_2$ | $a_3$ | $b_3$ | $c_3$ | $d'_3$ |   |
|   |   |   |   |   | $h'_2$ | $e_3$ | $f_3$ | $g_3$ | $h'_3$ |   |
| B2 |   |   |   |   | $l'_2$ | $i_3$ | $j_3$ | $k_3$ | $l'_3$ | B3 |
|   |   | $m'_2$ | $n'_2$ | $o'_2$ | $p'_2$ | $m'_3$ | $n'_3$ | $o'_3$ | $p'_3$ |   |

Step 3: predict $a_3, b_3, \ldots, k_3$ from original neighbour pixels and predicted/quantized/ inverse quantized $p'_0, d'_2, h'_2, l'_2, m'_1, n'_1, o'_1, p'_1$

|   | X | A | B | C | D | E | F | G | H |
|---|---|---|---|---|---|---|---|---|---|
|   | I | $A_0$ | $B_0$ | $C_0$ | $D_0$ |   |   |   | $D_1$ |
|   | J | $E_0$ | $F_0$ | $G_0$ | $H_0$ |   |   |   | $H_1$ |
|   | K | $I_0$ | $J_0$ | $K_0$ | $L_0$ |   |   |   | $L_1$ |
|   | L | $M_0$ | $N_0$ | $O_0$ | $P_0$ | $M_1$ | $N_1$ | $O_1$ | $P_1$ |
|   |   |   |   |   | $D_2$ | $A_3$ | $B_3$ | $C_3$ | $D_3$ |
|   |   |   |   |   | $H_2$ | $E_3$ | $F_3$ | $G_3$ | $H_3$ |
|   |   |   |   |   | $L_2$ | $I_3$ | $J_3$ | $K_3$ | $L_3$ |
|   |   | $M_2$ | $N_2$ | $O_2$ | $P_2$ | $M_3$ | $N_3$ | $O_3$ | $P_3$ |

Step 4: reconstruct pixels $A_3, B_3, \ldots, P_3$ from predicted $a_3, b_3, \ldots, p_3$ and encode the residuals

Fig.5

METHOD AND APPARATUS FOR ENCODING/DECODING IMAGE DATA

This application is a 371 of PCT/CN2010/000901 filed on Jun. 21, 2010.

This application claims the benefit, under 35 U.S.C. §365 of International Application PCT/CN2010/000901, filed Jun. 21, 2010, which was published in accordance with PCT Article 21(2) on Dec. 29, 2011 in English.

FIELD OF THE INVENTION

This invention relates to a method and an apparatus for encoding image data, and a method and an apparatus for decoding image data.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that the statements in this section are to be read in this light, and not as admissions of prior art.

Various video coding standards, e.g. MPEG-4 Part 10/AVC, apply a spatial based intra prediction algorithm for taking advantage of spatial redundancy within images. The intra prediction is done for various block sizes (e.g. 4×4, 8×8 and 16×16). Taking 4×4 block intra prediction as an example, there are in AVC nine pre-defined spatial predictors and the prediction directions for predicting. One of the biggest issues of intra prediction schemes employed in AVC is its complexity. In order to make a correct prediction of the current block, the blocks that are located on the left and upper side of a current block are reconstructed first, after their own encoding and before serving as predictors. Therefore, image encoding can only be performed sequentially, in left-to-right and up-down directions.

Nowadays, the processing architectures are evolving from high performance sequential processor architecture to parallel processor architectures (e.g. IBM's cell processor, Intel's Larabee processor, and nVidia or AMD's GPUs etc.) The introduction of these processors is changing the way computation is done with computers. The more parallelism an application has, the better the application will perform on the processors. However, in AVC encoding, intra prediction cannot be efficiently be performed using these processors, due to the fact that intra prediction is a natural born sequential processing problem.

Several attempts have been tried to improve the performance of intra prediction in video encoding and decoding, which are targeted at pixel level parallelization. This approach can make prediction for a line of pixels according to the prediction mode. These methods are efficient on DSP or FPGA implementations, but the above-mentioned parallel processor architectures cannot take advantage of those proposed schemes.

SUMMARY OF THE INVENTION

In light of the above, a solution for implementing an improved intra prediction method on a parallel processing platform remains a problem to be solved. The present invention provides such solution, and is suitable for improving the efficiency of intra prediction at least on the encoder side. In various embodiments, also an improvement on the decoder side is achieved.

The present invention is based on the recognition of the fact that image prediction can be based on estimated predictors instead of exactly reconstructed predictors, while yielding good prediction results and therefore high compression efficiency.

In principle, a method for encoding image data where the image data are structured in blocks comprises for each block in (at least a portion of) the image a first prediction step of predicting the pixels of two edges of a block, based on original pixels of neighbouring blocks, wherein estimated predictor pixels are obtained, and a second prediction step of predicting remaining pixels of the block from the predicted predictor pixels of at least neighbouring blocks.

According to one embodiment of the invention, a method for encoding image data, the image data being structured in blocks, comprises for each block in (at least a portion of) the image steps of predicting the pixels of two edges of a block in a first prediction step, wherein the prediction is based on pixels of neighbouring blocks from the original image, and wherein estimated predictor pixels are obtained, determining residual data for the estimated predictor pixels, performing quantization and inverse quantization on the determined residual data for the estimated predictor pixels, wherein reconstructed residual data for estimated predictor pixels are obtained, reconstructing predictor pixels, wherein the difference between original pixels and reconstructed residual data for estimated predictor pixels is obtained, in a second prediction step, predicting remaining pixels of the block from the predicted predictor pixels of at least neighbouring blocks, determining residual data for each predicted pixel resulting from the first or second prediction step, the residual data being the difference between the predicted pixel and its corresponding original pixel, and entropy encoding the residual data.

Further, according to another embodiment of the invention, a device for encoding image data, which are structured in blocks, comprises first and second prediction means, first and second residual determining means, quantizer and inverse quantizer means, reconstruction means, and entropy coding means. The apparatus performs for each block in at least a portion of the image the steps of in the first prediction means, predicting the pixels of two edges of a block in a first prediction step, wherein the prediction is based on pixels of neighbouring blocks from the original image, and wherein estimated predictor pixels are obtained;

in the residual determining means, determining residual data for the estimated predictor pixels;

in the quantizer and inverse quantizer, performing quantization and inverse quantization on the determined residual data for the estimated predictor pixels, wherein reconstructed residual data for estimated predictor pixels are obtained;

in the reconstruction means, reconstructing predictor pixels, wherein the difference between original pixels and reconstructed residual data for estimated predictor pixels is obtained;

in the second prediction means, in a second prediction step, predicting remaining pixels of the block from the predicted predictor pixels of at least neighbouring blocks;

in the second residual determining means, determining residual data for each predicted pixel resulting from the first or second prediction step, the residual data being the difference between the predicted pixel and its corresponding original pixel; and in the entropy coding means, entropy encoding the residual data.

One advantage of the invention is that it enables faster estimation of reconstructed predictors. Another advantage is that that the encoder can perform intra prediction for all blocks of at least a portion of an image simultaneously, based on the estimated predictors, instead of relying on the reconstructed exact predictors from the conventional sequential encoding process. Thus, encoding is accelerated.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 predictors for all 4×4 blocks in a current frame;

FIG. 4 pixels in the first phase of the encoding procedure;

FIG. 5 pixels in the second phase of the encoding procedure;

DETAILED DESCRIPTION OF THE INVENTION

Figure 1:
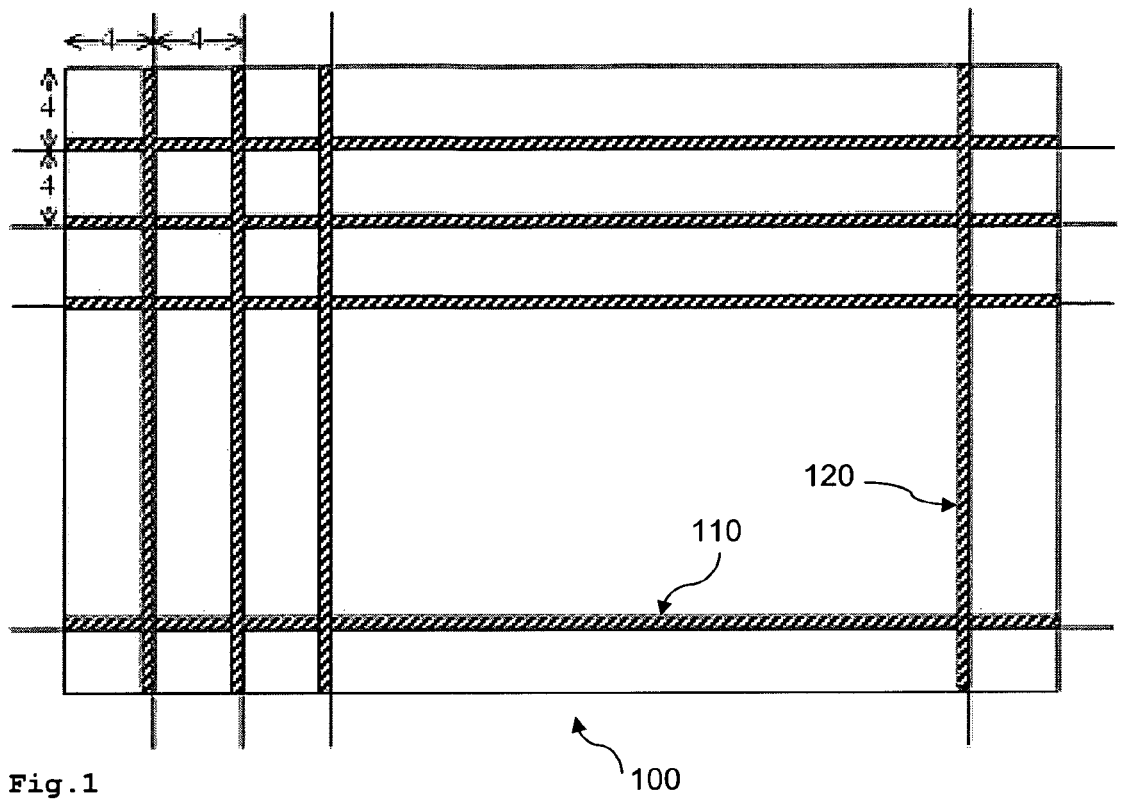

FIG. 1 shows a video frame or image 100, which is structured into blocks of 4×4 pixels each, and the predictors 110, 120 for all 4×4 blocks in the current frame. The frame is intra-predicted, i.e. all prediction is done from other pixel data of the same frame. The predictors 110,120 for all 4×4 blocks in the current coding frame are the lower and right edges of each 4×4 block (only if the edge has a neighbour block), and are shown shaded.

Figure 2:
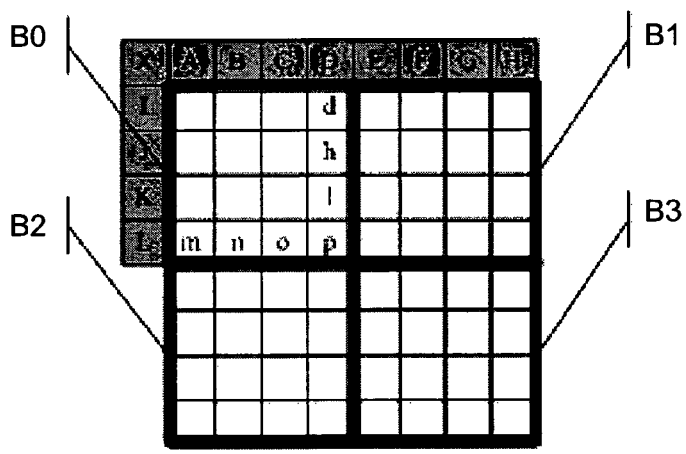
FIG. 2 predictors for neighbouring blocks in an exemplary 4×4 block.

In more detail, four 4×4 blocks B0-B3 and B0's neighbouring pixels X,A-L in the original frame are shown in FIG. 2. To make conventional intra prediction to all 4×4 blocks in the current coding frame, reconstructed predictors are required. That is, in a conventional encoder right edge pixels d,h,l,p of a current block B0 are predicted, reconstructed and then used to predict pixels of a horizontally adjacent block B1. Lower edge pixels m,n,o,p of a current block B0 in a conventional encoder are predicted, reconstructed and then used to predict pixels of a vertically adjacent block B2. In the AVC coding standard, the predictors are reconstructed and usable not before the macroblocks (MBs) located in the top and left have been reconstructed. According to the present invention, the reconstructed predictors are generated by estimation before actually coding the MBs, i.e. fast approximation of the reconstructed predictors is possible as a separate step. This has the advantage that all predictors are available simultaneously before actually encoding the image. Therefore the actual intra-prediction, which also takes a long time, can be made for some or all blocks of at least a portion of the image, or the complete image, simultaneously.

Figure 3:
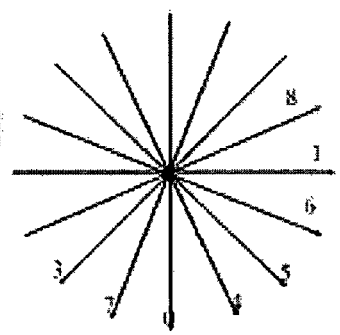
FIG. 3 a 4×4 block with its boundary pixels and nine intra prediction modes ($9^{th}$ mode is DC mode, not shown)
Figure 6:
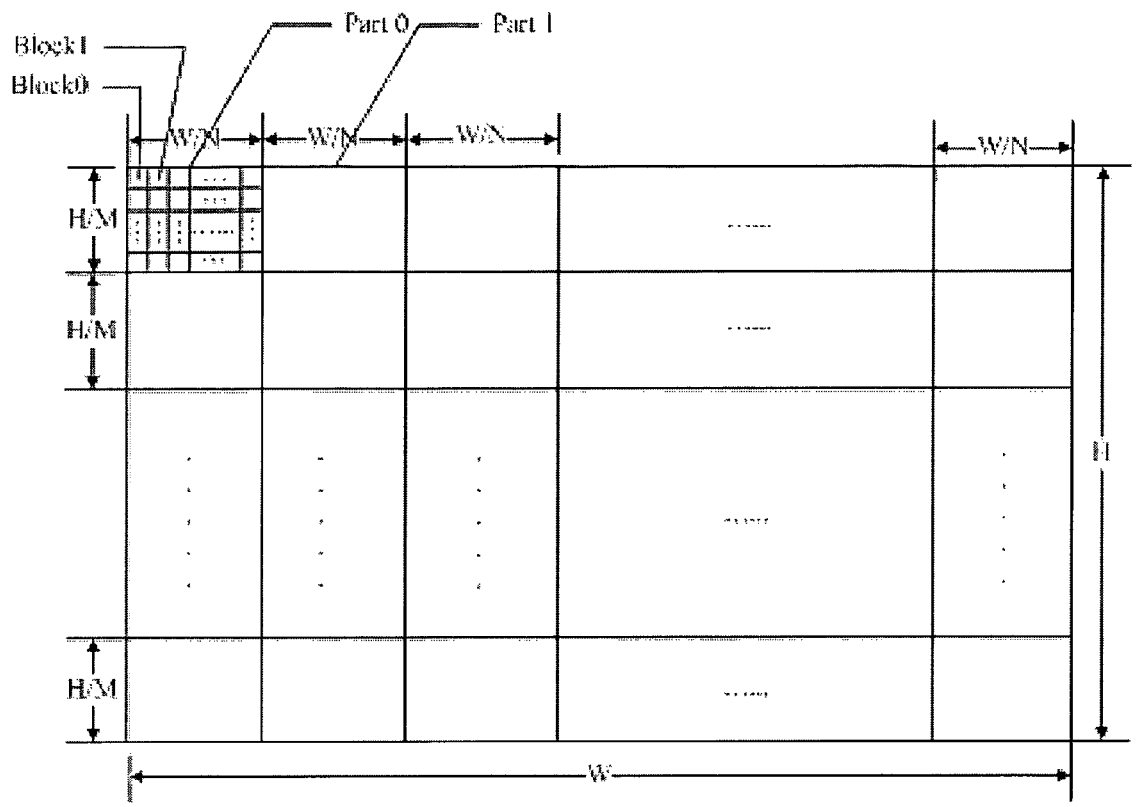
FIG. 6 a frame that is divided into N×M portions, each of which being predicted independently.
Figure 7:
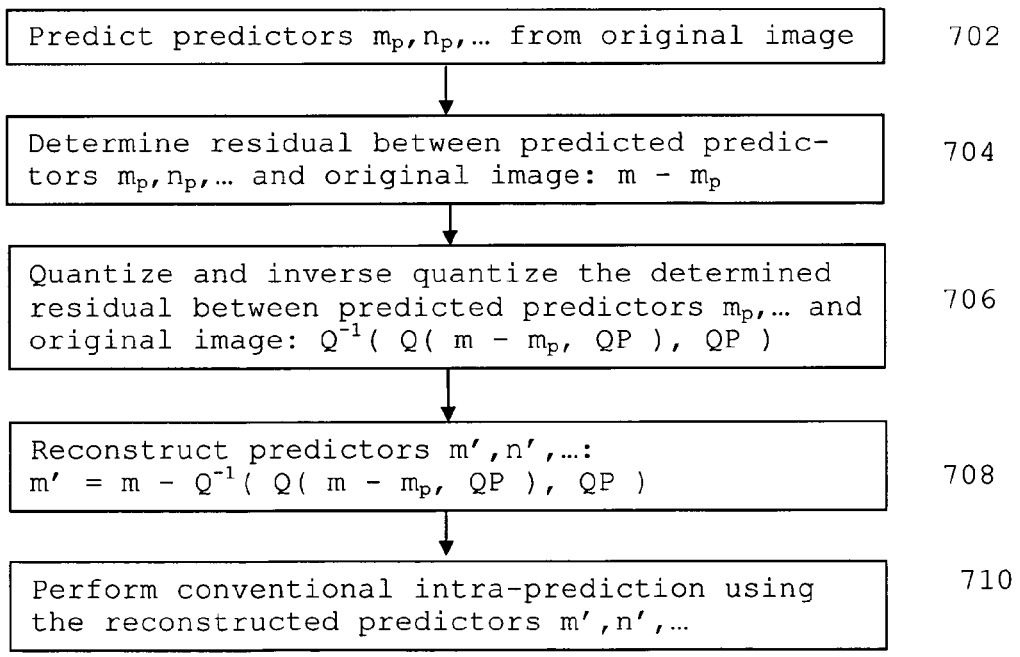
FIG. 7 a flow-diagram of the encoding procedure.
Figure 8:
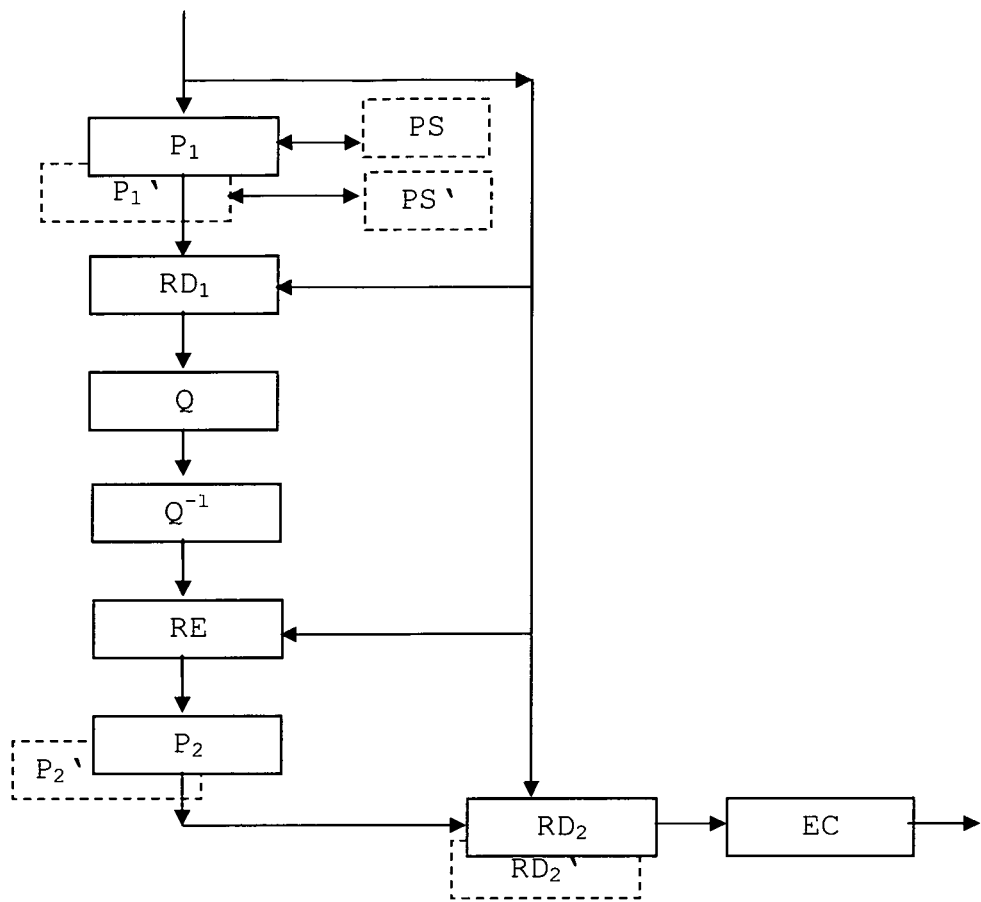
FIG. 8 an overview of an encoder structure.

Instead of using the reconstructed predictors to perform intra prediction, the invention uses the neighbouring pixels in the original frame to make the prediction directly. Then, e.g. for block B0 in FIG. 2, the prediction is directly done using original pixels X, A, . . . , L and using a spatial prediction mode (e.g. one of the nine spatial prediction modes of AVC). This generates a predicted block per spatial prediction mode. For the AVC example, there are nine candidate predicted blocks B01, B02, . . . , B09 possible, according to the nine prediction modes shown in FIG. 3. In one embodiment, more than one prediction mode is checked, and the best mode to perform the prediction is determined by selecting the one with optimal rate-distortion.

$$\text{mode}=i, (i=\min(\text{error\_func}(B_0-B_{0i}))) \qquad \text{(Eq. 1)}$$

error_func is an error measuring method. It can in principle be any known error measuring method (sum-of-absolute-differences SAD, sum-of-absolute-transformed-differences SATD, mean-square-error MSE, etc.).

For the predictor pixels m,n,o,p,d,h,l in a current block B0, its reconstruction can be estimated according to the best prediction mode and selected or given quantization parameters (QP). Taking a pixel m as an example, the estimation reconstruction m' is calculated as follows:

$$m'=m-Q^{-1}(Q(m-m_p),QP),QP) \qquad \text{(Eq. 2)}$$

where Q(A, QP) means the quantization of a value A using a quantization parameter QP, and $Q^{-1}$(A, QP) means the inverse quantization of a value A using the quantization parameter QP, and $m_p$ means the prediction value of m using the best prediction mode.

In this way, in one embodiment, all the predictors for the blocks are estimated. The predictors are the edge pixels of two edges of each block. Note that this need not necessarily be the lower and right edges of a block: it depends on the possible prediction direction. Using lower and right edge pixels of a block is suitable for left-to-right and up-to-down prediction directions, e.g. line-wise or column-wise.

In the next step, all chosen best prediction modes for each block and the estimated predictors are used to perform intra prediction for all 4×4 blocks (of at least a portion of the image) simultaneously. That is, the intra prediction within the encoding process is based not on reconstructed pixels, but on estimated reconstructed pixels that are obtained from the original pixels. This simplifies the encoding process and encoder, and accelerates it.

In one embodiment, all possible prediction modes are checked in order to decide the best prediction mode.

However, the complexity of this approach can be reduced. In block B0, the pixels m,n,o,p,d,h and l that shall be used as estimated predictors are relatively far away from their own predictor pixels X, A, B, . . . , L. Therefore, the mode selection can be simplified by using only major prediction directions to perform a prediction specifically for m,n,o,p,d,h and l to make the below-described estimation. In the simplified mode selection, only the DC mode, vertical intra-prediction mode and horizontal intra-prediction mode are used to estimate m,n,o, p,d,h and l. Then, the prediction error $\text{ERROR}_{DC}$, $\text{ERROR}_{ver}$ and $\text{ERROR}_{hor}$ between these pixels and the estimated pixels is calculated. The ERROR function can be any known error measurement function (SAD, SATD, MSE, etc.) Choose the smallest ERROR from all major directions to estimate the reconstructed predictors, using equation (2).

For the intra-prediction of remaining pixels of a block, the estimated predictors are used to perform intra prediction based on all allowed prediction modes. For example, the nine above-shown intra-prediction modes of AVC can be used. Note that the intra prediction modes, and corresponding mode selection, for estimating the predictors are in principle independent from the intra prediction modes, and corresponding mode selection, for the actual intra-prediction of all the pixels. Then, all 4×4 blocks can be predicted simultaneously, using the estimated predictors.

In the following, the encoding process is described in more detail. The encoding is a process that has two phases.

The first phase of the encoding procedure is shown in FIG. 4. In a first step, lower-edge pixels $m_0, n_0, o_0, p_0$ and right-edge pixels $d_0, h_0, l_0, p_0$ of each block are predicted from pixels of neighbouring blocks of the original image A-L. Edge pixels of the leftmost or uppermost blocks can be predicted using the same modes as for conventional intra-coding, e.g. DC mode, since these blocks have no left or upper neighbours. At the end of the first phase, as shown in FIG. 4b), all predictors of all blocks (of at least that portion of the image to which accelerated intra-prediction is applied) are estimated. Thus, each block has estimated predictors in neighbouring blocks in two directions available (left and upper direction in FIG. 4), before any block is actually encoded. This is possible because the estimated predictors are predicted from pixels of the original image.

In a second step, which may be considered as part of the first phase or the second phase or as separate intermediate phase, the residuals between the estimated predictors and their original pixels are determined, e.g. $m-m_p$, $n-n_p$ etc. These residuals are then quantized and inverse quantized, in order to make them more similar to the predictors that will be available at the decoder. This results in reconstructed predictor residuals for all blocks (in the concerned portion of the image), according to $Q^{-1}(Q(m-m_p), QP)/QP)$, $Q^{-1}(Q(n-n_p), QP)$ QP) etc.

The actual estimated predictors m', n', ... for each of these blocks are then calculated according to eq. 2.

At the end of the first phase and after the quantization and inverse quantization, all predictors of all blocks (of at least that portion of the image to which accelerated intra-prediction is applied) are estimated. Thus, each block has estimated predictors in two neighbouring blocks, as shown in FIG. 4b). Accelerated intra-prediction can be applied to one or more portions of an image simultaneously. Other portions may use other, e.g. conventional, intra prediction. For example, conventional intra prediction may be applied in a region-of-interest (ROI), while accelerated intra prediction according to the invention is used in remaining portions of the image.

The second phase of the encoding process is shown in FIG. 5. It comprises prediction and reconstruction of remaining pixels, i.e. other than predictor pixels, based on the predictor pixels that result from the first phase. In step 3, pixels $a_3, b_3, \ldots, k_3$ of a block B3 are predicted using intra-prediction, which uses the actual estimated predictor pixels of neighbouring blocks B0, B1 and B2. In detail, the following estimated predictors are used: $p'_0$ from upper left adjacent (i.e. neighbouring) block B0, lower edge pixels $m'_1$-$p'_1$ from upper adjacent block B1, and right-edge pixels $d'_2, h'_2, l'_2, p'_2$ from left adjacent block B2. In another embodiment, any combination of upper edge, lower edge, left edge and right edge pixels of adjacent blocks can be used as predictors, depending on the prediction direction.

In step 4, shown in FIG. 5, the predicted remaining pixels $a_3, b_3, \ldots, k_3$ of a block B3 and the original pixels $A_3, B_3, \ldots, K_3$ of said block are used to determine prediction residuals $A_{3,res}, B_{3,res}, \ldots, K_{3,res}$ of said block. The prediction residuals are then entropy-encoded, as usual.

Since the estimated predictors are slightly different from the exact predictors that would be used by conventional sequential intra-prediction, the encoded image data resulting from the two methods are slightly different. In other words, encoder and decoder do not use exactly the same predictors, since an encoder uses the estimated predictors and a decoder uses conventionally reconstructed predictors. However, the different predictors of encoder and decoder are so similar that the difference is not visible in the image. It has been found that the simplified prediction based on estimated predictors, as employed by the invention, is not only faster and less computational expensive, but also in terms of quality yields much better results than could be expected.

Embodiments of the present invention comprise at least the following:

In one embodiment, a method for encoding image data, the image data being structured in blocks, comprises for each block in at least a portion of the image the steps of predicting the pixels of two edges of a block in a first prediction step, wherein the prediction is based on pixels of neighbouring blocks from the original image, and wherein estimated predictor pixels are obtained;

determining residual data for the estimated predictor pixels;

performing quantization and inverse quantization on the determined residual data for the estimated predictor pixels, wherein reconstructed residual data for estimated predictor pixels are obtained, according to $Q^{-1}(Q(m-m_p), QP), QP)$;

reconstructing predictor pixels, wherein the difference between original pixels and reconstructed residual data for estimated predictor pixels is obtained, according to $m' = m - Q^{-1}(Q(m-m_p), QP), QP)$;

in a second prediction step, predicting remaining pixels of the block from the predicted predictor pixels of at least neighbouring blocks;

determining residual data for each predicted pixel resulting from the first or second prediction step, the residual data being the difference between the predicted pixel and its corresponding original pixel; and entropy encoding the residual data.

In one embodiment of the method for encoding, the second prediction step is executed in parallel for at least two blocks of the image simultaneously, and the step of determining residual data is executed in parallel for at least two blocks of the image simultaneously. This is possible because there are no dependency issues among blocks, since the original pixel values are used.

In one embodiment of the method for encoding, the first prediction step is executed in parallel for at least two blocks of the image simultaneously. This is possible because there are no dependency issues among blocks, since the original pixel values are used in the first prediction step.

In one embodiment of the method for encoding, the first prediction step further comprises determining for each of the estimated predictor pixels a best prediction mode from a given group of spatial intra prediction modes.

In one embodiment of the method for encoding, the given group of spatial intra prediction modes comprises DC mode, horizontal prediction mode and vertical prediction mode. In one embodiment of the method for encoding, the given group of spatial intra prediction modes consists of only DC mode, horizontal prediction and vertical prediction.

In one embodiment of the method for encoding, the image is structured into at least two portions, wherein the method is executed in parallel for at least two portions of the image simultaneously and independently.

In one embodiment of the method for encoding, the at least one portion of the image is not square, wherein if there is more than one portion, all portions have the same shape and same amount of blocks.

In one embodiment a method for decoding image data, the image data being structured in blocks and having at least two portions, comprises, in all portions of the image independently and simultaneously, the steps of reconstructing pixels of the blocks from received pixel data;

predicting pixels in the blocks from said reconstructed pixels of the block or from reconstructed pixels of neighboring blocks; and reconstructing the predicted pixels based on received residual data.

In one embodiment, a device for encoding image data, the image data being structured in blocks, comprises first and second prediction means; first and second residual determining means; quantizer and inverse quantizer;

reconstruction means; and entropy coding means;

wherein the apparatus performs for each block in at least a portion of the image the steps of in the first prediction means, predicting the pixels of two edges of a block in a first prediction step, wherein the prediction is based on pixels of neighbouring blocks from the original image, and wherein estimated predictor pixels are obtained;

in the residual determining means, determining residual data for the estimated predictor pixels;

in the quantizer and inverse quantizer, performing quantization and inverse quantization on the determined residual data for the estimated predictor pixels, wherein reconstructed residual data for estimated predictor pixels are obtained, according to $Q^{-1}(Q(m-m_p), QP), QP), Q^{-1}(Q(n-n_p), \ldots$;

in the reconstruction means, reconstructing predictor pixels m', wherein the difference between original pixels and reconstructed residual data for estimated predictor pixels is obtained, according to $m'=m-Q^{-1}(Q(m-m_p), QP), QP)$, $n'= \ldots$;

in the second prediction means, in a second prediction step, predicting remaining pixels of the block from the predicted predictor pixels of at least neighbouring blocks;

in the second residual determining means, determining residual data for each predicted pixel resulting from the first or second prediction step, the residual data being the difference between the predicted pixel and its corresponding original pixel; and in the entropy coding means, entropy encoding the residual data.

In one embodiment, the encoding device further comprises at least a second set of second prediction means and residual determining means, wherein the second prediction step is executed in parallel in the at least two second prediction means for at least two blocks of the image simultaneously, and the step of determining residual data is executed in parallel in the at least two residual prediction means for at least two blocks of the image simultaneously.

In one embodiment, the encoding device further comprises at least two of the first prediction means, wherein the first prediction step is executed in the at least two first prediction means in parallel for at least two blocks of the image simultaneously.

In one embodiment of the encoding device, the first prediction means comprises a prediction mode selector for determining for each of the estimated predictor pixels a best prediction mode from a given group of spatial intra prediction modes.

In one embodiment of the encoding device, the image is structured into at least two portions, and the device operates in parallel for at least two portions of the image simultaneously and independently.

Figure 9:
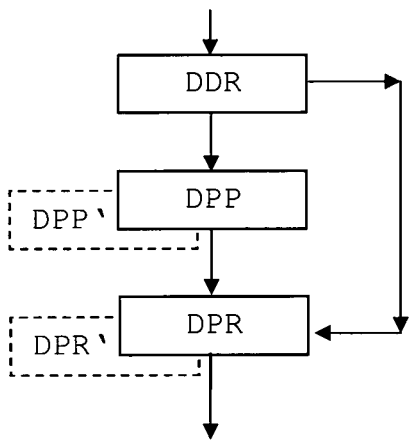
FIG. 9 an overview of a decoder structure.

For most of the above embodiments, the resulting data stream can be decoded conventionally. However, where the image is split into portions, it is also possible to decode each portion independently, and thus in parallel simultaneously. In one embodiment, as shown in FIG. 9, a device for decoding image data is concerned: The device for decoding image data, the image data being structured in blocks and having at least two independent portions, comprises decoder data receiving means DDR, decoder pixel reconstruction means DPR, and decoder pixel prediction means DPP. After receiving pixel data, prediction mode data and residual data in the decoder data receiving means DDR, the device performs in all portions of the image independently and simultaneously the following steps: in the decoder pixel reconstruction means DPR, reconstructing pixels based on received pixel data; in the decoder pixel prediction means DPP, predicting pixels in the blocks from said reconstructed pixels of the block or from reconstructed pixels of neighbouring blocks; and further in the decoder pixel reconstruction means DPR, reconstructing the predicted pixels based on reconstructed predictors and received residual data. For parallel decoding two or more sets of decoder pixel reconstruction means DPR and decoder pixel prediction means DPP may be employed in the decoder.

In the above illustrative embodiments, intra 4×4 prediction is used as an example. It is clear that the same mechanism can seamlessly be applied to other intra predictions, e.g. intra 16×16 prediction. Usually, the processing of a block is independent from its relative position in a MB.

In one embodiment of the encoding device or the decoding device, the at least one portion of the image is not square, and if there is more than one portion, all portions have the same shape and same amount of blocks.

Different embodiments described above can be used in combination. For example, the dividing images into more than one portion and processing the portions simultaneously has the lowest measurable impact on prediction quality. The usage of estimated predictors with limited set of prediction directions yields the highest performance improvement. Thus, it is possible to choose among different combinations of the disclosed features, depending on different requirements and conditions.

Further, the spirit of the idea can be extended to design an efficient loop filter implementation, where the pixel values to be filtered can be predicted using the methods described above. Also any product that uses parallel intra prediction mode decisions may use features described above.

It will be understood that the present invention has been described purely by way of example, and modifications of detail can be made without departing from the scope of the invention. While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Although the present invention has been disclosed with regard to AVC, one skilled in the art would recognize that the method and devices described herein may be applied to any coding standard that uses intra-prediction. It is expressly intended that all combinations of those elements that perform substantially the same function in substantially the same way to achieve the same results are within the scope of the invention. Substitutions of elements from one described embodiment to another are also intended and contemplated.

Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

The invention claimed is:

1. A method for encoding image data, the image data being structured in blocks, the method comprising, for each block in at least a portion of the image:
   predicting pixels of two edges of a block in a first prediction, wherein the first prediction is based on pixels of neighboring blocks from an original image, and wherein estimated predictor pixels are obtained;
   determining residual data for the estimated predictor pixels;
   performing quantization and inverse quantization on the determined residual data for the estimated predictor pixels, wherein reconstructed residual data for estimated predictor pixels are obtained;
   reconstructing predictor pixels, wherein a difference between original pixels and reconstructed residual data for estimated predictor pixels is obtained;
   predicting remaining pixels of the block from the predicted predictor pixels of at least neighboring blocks, in a second prediction;
   determining residual data for each predicted pixel resulting from the first or second prediction, the residual data being a difference between the predicted pixel and its corresponding original pixel; and
   entropy encoding the residual data.

2. The method according to claim 1, wherein the second prediction is executed in parallel for at least two blocks of the image simultaneously, and the determining residual data is executed in parallel for at least two blocks of the image simultaneously.

3. The method according to claim 1, wherein the first prediction is executed in parallel for at least two blocks of the image simultaneously.

4. The method according to claim 1, wherein the first prediction further comprises determining for each of the estimated predictor pixels a best prediction mode from a given group of spatial intra prediction modes.

5. The method according to claim 4, wherein the given group of spatial intra prediction modes comprises DC mode, horizontal prediction and vertical prediction.

6. The method according to claim 4, wherein the given group of spatial intra prediction modes consists of DC mode, horizontal prediction and vertical prediction only.

7. The method according to claim 1, wherein the image is structured into at least two portions, and wherein the method is executed in parallel for at least two portions of the image simultaneously and independently.

8. The method according to claim 1, wherein the at least one portion of the image is not square, and wherein if there is more than one portion, all portions have the same shape and same amount of blocks.

9. A method for decoding image data, the image data being structured in blocks and having at least two portions, the method comprising, in all portions of the image independently and simultaneously:
   reconstructing first pixels of the blocks from received pixel data, the first pixels being on edges of the blocks;
   predicting second pixels within in the blocks from said reconstructed pixels on edges of the block or from reconstructed pixels on edges of neighboring blocks, the second pixels being not on edges of the block; and
   reconstructing the predicted second pixels based on received residual data.

10. A device for encoding image data, the image data being structured in blocks, the device comprising a parallel processor configured to implement:
    a first and a second prediction unit;
    a first and a second residual determining unit;
    a quantizer unit and an inverse quantizer unit;
    a reconstruction unit; and
    an entropy coder;
    wherein the device performs, for each block in at least a portion of the image,
    in the first prediction unit, predicting pixels of two edges of a block in a first prediction, wherein the prediction is based on pixels of neighboring blocks from the original image, and wherein estimated predictor pixels are obtained;
    in the first residual determining unit, determining residual data for the estimated predictor pixels;
    in the quantizer unit and inverse quantizer unit, performing quantization and inverse quantization on the determined residual data for the estimated predictor pixels, wherein reconstructed residual data for estimated predictor pixels are obtained;
    in the reconstruction unit, reconstructing predictor pixels, wherein a difference between original pixels and reconstructed residual data for estimated predictor pixels is obtained;
    in the second prediction unit, in a second prediction, predicting remaining pixels of the block from the predicted predictor pixels of at least neighboring blocks;
    in the second residual determining unit, determining residual data for each predicted pixel resulting from the first or second prediction, the residual data being a difference between the predicted pixel and its corresponding original pixel; and
    in the entropy coder, entropy encoding the residual data.

11. The device according to claim 10, further comprising at least a second set of second prediction units and a second residual determining unit, wherein the second prediction is executed in parallel in the at least two second prediction units for at least two blocks of the image simultaneously, and the determining residual data is executed in parallel in the at least two residual prediction units for at least two blocks of the image simultaneously.

12. The device according to claim 10, further comprising at least two of the first prediction units, wherein the first prediction is executed in the at least two first prediction units in parallel for at least two blocks of the image simultaneously.

13. The device according to claim 10, wherein the first prediction unit comprises a prediction mode selector for determining for each of the estimated predictor pixels a best prediction mode from a given group of spatial intra prediction modes.

14. The device according to claim 10, wherein the image is structured into at least two portions, and wherein the device operates in parallel for at least two portions of the image simultaneously and independently.

15. The device according to claim 10, wherein the at least one portion of the image is not square, and wherein if there is more than one portion, all portions have the same shape and same amount of blocks.

16. A device for decoding image data, the image data being structured in blocks and having at least two independent portions, the device comprising
    a decoder data receiver configured to receive pixel data, prediction mode data and residual data;
    at least two decoder pixel reconstruction units; and
    at least two decoder pixel prediction units;

wherein the device is configured to perform, after receiving the pixel data, prediction mode data and residual data in the decoder data receiver, the following in the at least two portions of the image independently and simultaneously:

in the at least two decoder pixel reconstruction units, reconstructing first pixels based on the received pixel data, the first pixel being on block edges;

in the at least two decoder pixel prediction units, predicting second pixels in the blocks from said reconstructed first pixels of the block or from reconstructed pixels of neighboring blocks, the second pixels being not on block edges; and in the at least two decoder pixel reconstruction units, reconstructing the predicted second pixels based on reconstructed predictors and received residual data.

17. A device for decoding image data, the image data being structured in blocks and having at least two independent portions, the device comprising:

a decoder data receiver configured to receive pixel data, prediction mode data and residual data;

at least two decoder pixel reconstruction units;

at least two decoder pixel prediction units; and a parallel processor configured to process the at least two portions of the image independently and simultaneously after receiving the pixel data, prediction mode data and residual data in the decoder data receiver.

18. The device for decoding image data according to claim 17, wherein the at least two decoder pixel reconstruction units are configured to reconstruct first pixels based on the received pixel data, the first pixel being on block edges.

19. The device for decoding image data according to claim 17, wherein the at least two decoder pixel prediction units are configured to predict second pixels in the blocks from said reconstructed first pixels of the block or from reconstructed pixels of neighboring blocks, the second pixels being not on block edges.

20. The device for decoding image data according to claim 19, wherein the at least two decoder pixel reconstruction units are configured to reconstruct the predicted second pixels based on reconstructed predictors and received residual data.

* * * * *